United States Patent [19]
Knoll

[11] 4,293,028
[45] Oct. 6, 1981

[54] ARRANGEMENT FOR CONTROLLING ROOM TEMPERATURE

[75] Inventor: Alois Knoll, Schönaich, Fed. Rep. of Germany

[73] Assignee: Centra-Burkle GmbH & Co., Schönaich, Fed. Rep. of Germany

[21] Appl. No.: 82,494

[22] Filed: Oct. 9, 1979

[30] Foreign Application Priority Data

Oct. 9, 1979 [DE] Fed. Rep. of Germany ....... 2843929

[51] Int. Cl.³ .......................... F23N 5/20; F24F 3/00
[52] U.S. Cl. .................................. 165/12; 236/46 R; 236/91 R; 165/22
[58] Field of Search ............. 236/46 R, 91 R; 165/12, 165/22

[56] References Cited

U.S. PATENT DOCUMENTS 3,964,676  6/1976  Rooks et al. .................... 236/46 R
3,979,059  9/1976  Davis et al. ...................... 236/46 R
4,172,555 10/1979  Levine .............................. 236/46 R Primary Examiner—William E. Wayner
Attorney, Agent, or Firm—Edwin E. Greigg

[57] ABSTRACT

An arrangement for controlling room temperature in conjunction with a heating or air conditioning system which operates throughout successive and uniform periods of time, each period of time being divided into a first time interval and a second time interval and including a first computer for a rapid heating or rapid cooling curve and a second computer for computing an actual value room temperature curve in accordance with input data including outside weather conditions, building value etc., the heating or air conditioning system being switched off at the beginning of the second time interval and switched on at a predetermined instant during the second time interval thereby effecting a substantial savings in energy.

21 Claims, 2 Drawing Figures

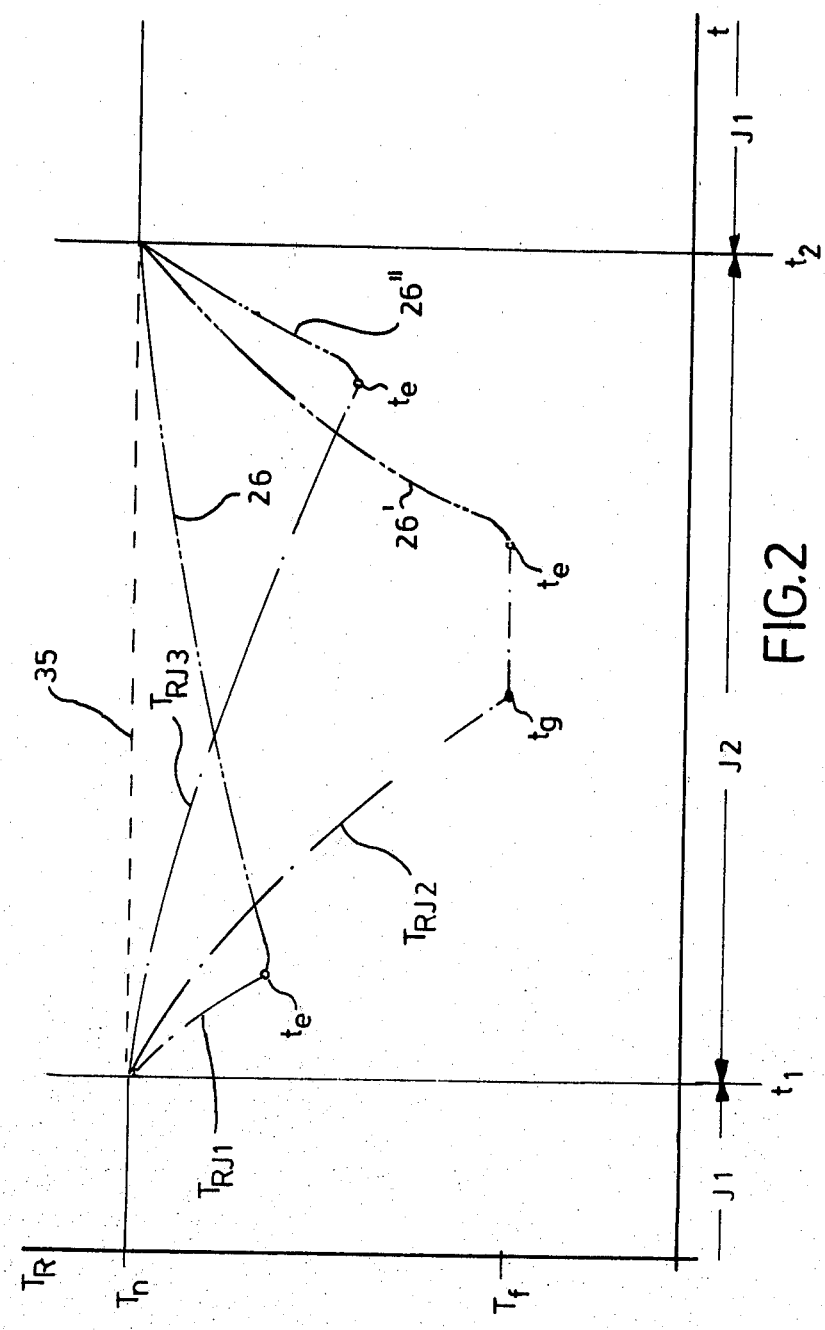

ARRANGEMENT FOR CONTROLLING ROOM TEMPERATURE

BACKGROUND OF THE INVENTION

The invention relates to an arrangement for controlling room temperature.

In the known arrangements for controlling room temperature, the actual value of the room temperature has been measured at the beginning of every second time interval by means of a temperature probe disposed in one of the rooms being controlled—that is, the so-called "test room". As a result, a switch-on time was determined for rapid heat transfer, either rapid heating or rapid cooling, in a particular second time interval which was incorrect, for the rooms taken as a whole, whenever the room temperature in the test room deviated substantially from the value which would otherwise have resulted. This was due to misleading factors such as an open door or window or the like. Furthermore, the disposition of a room temperature probe often involves substantial expense in terms of installation techniques. To attain precision in ascertaining the room temperature value, which is fundamental to the sense of well-being on the part of persons in the room, the wall temperature in the test room at a particular time must also be taken into consideration, so that two or more room temperature probes must then be disposed in the test room whose values are averaged either in weighted or in unweighted form.

OBJECTS AND SUMMARY OF THE INVENTION

It is accordingly a principal object of the invention to create an arrangement for controlling room temperature in which the "test room" is not used.

In the arrangement in accordance with the invention, there is no longer a room temperature probe and thus no "test room" either, because the course over time of the actual value of the room temperature is computed, from the beginning of every second time interval until the switchover to rapid heating or rapid cooling using a first computer, by means of a second computer. It will be appreciated that the first computer and the second computer, if desired, can be combined into one common computer which may, if needed, also contain components in common. The two computers must be supplied with data for the computation of the curves which they are intended to compute, such as clock time or synchronizing time, beginning or end of the second time interval, initially set normal value for the room temperature to be controlled, instantaneous weather conditions (either the outside temperature alone or the outside temperature plus such factors as wind, entering sunlight, and the like may serve as the standard for gauging the weather), building values, and values for the heat transfer system, such as a heating or air conditioning system. Weather data can be furnished to the computers by a common weather transducer, such as an outside temperature probe. A single time switch clock may be associated in common with both computers for furnishing them with the clock time, the sychronizing time, and the switching instant. In some circumstances, the two computers can be fed the values for the building and for the heating or air conditioning system by means of initially settable setting elements common to both computers.

The invention enables the maxiumum possible savings in energy during the second time intervals, because there is no test room which could, under the influence of such factors as an open window, cause premature switching on of the rapid heating or cooling by means of a temperature probe disposed in such a room. Furthermore, the expense of installation for any temperature probes is saved in the arrangement in accordance with the invention. The expense for the second computer, which is required in place of the temperature probe and for the circuits connected with it, may be kept very low in view of the present state of microcomputer techonology.

The initial setting of the building values (i.e., building constants, heat insulation, heat-retaining mass of the rooms, and the like) as well as of the values for the heating or air conditioning system (such as their heat capacity and maximum output) may be fed into the first and second computers by means of initial setting elements, which permit the initial setting, in the required manner, of the course over time of the curves which are to be computed by these computers.

The computed actual value room temperature curve and the computed rapid heat transfer curve, which is either a rapid heating curve or a rapid cooling curve, may be provided as approximately straight lines, in cases which are situated particularly simply, with the slope of the straight lines being adjustable. In general, however, it is more favorable to provide these curves, which are to be computed and if necessary stored by the first and second computers, as nonlinear curves, preferably as exponential functions, and it is particularly suitable if they are functions of the second or third power. The rapid heating or rapid cooling curve may also have a course such as that described in German Patent Application Ser. No. P 28 13 081.6-13, for example.

The determination of the rapid heating or rapid cooling curve can take place in a known manner. For instance, with several different outside temperatures, several rapid heating or rapid cooling curves can be adopted experimentally with maximum heating or cooling of the rooms. Then, by means of these experimentally ascertained curves, all the other curves may be extrapolated either continuously or in stages; i.e., the course of these curves can be fixed in accordance with the outside temperature over the entire expected outside temperature range. Alternatively, these curves may initially be set in approximate form on the basis of known values for the heating or air conditioning system and known building values, and then, should it be found during operation that there is still insufficient precision, their initial setting elements may be adjusted in a predetermined direction until the desired precision has been attained. The same is true for the ascertainment and initial setting of the actual value curve for the room temperature which is to be computed so that no further explanation is necessary on this point.

The heating or air conditioning system may be of any suitable construction. Such a construction may relate to heating or air conditioning systems having heat exchangers which have water or steam flowing through them. However, heating or air conditioning systems are also possible in which the heating or cooling of the rooms takes place solely by blowing in tempered supply air. Examples of such heating or air conditioning syustems are: central heating by means of warm water, steam or gas; hot-air heating systems; and air conditioning systems with or without induction-coil apparatuses.

The particular heating or air conditioning system may serve exclusively for heating a single group of rooms whose temperature is controlled in common, or the particular heating or air conditioning system may serve the purpose of heating several groups of rooms, with one arrangement, in accordance with the invention, being assigned to each group of rooms for controlling their room temperature in common during first and second time intervals. The heating or air conditioning system may serve, for example, to heat a building containing a plurality of apartments, with each apartment comprising a group of rooms; i.e., each apartment is assigned its own arrangement in accordance with the invention. Instead of the group of rooms being an apartment, in the sense of the invention it may also be a zone in an apartment, or some other zone in a building. For example, in many cases, all the rooms on the north side of an office building, factory building or the like could comprise one building zone which is assigned a first arrangement in accordance with the invention. The rooms on the south side could comprise a second zone which is assigned a second arrangement in accordance with the invention, with both arrangements being served by the same heating or air conditioning system. Frequently the building may contain only a single group of rooms controlled in common, in accordance with the invention, such as in the case of single-family houses.

The actual value room temperature curve may, in the case of an analog computer, be computed continuously, or, in the case of a digital computer, periodically and discontinuously. The curves need not be plotted or stored. Rather, it is suitable and sufficient for the second computer to furnish a signal, such as a direct voltage, which represents the particular instantaneous value for this curve. In the case of the first computer, it is sufficient and advantageous for it to compute the instant of initiation of the rapid heating or cooling based on the instantaneous actual value of the computed room temperature. However, other types of computation are also possible.

The switching off or substantial reduction of the supply or withdrawl of heat energy to or from the group of rooms by the heating or air conditioning system at the beginning of each second time interval may be provided variously depending on the type of heating or air conditioning system used. Preferably, at the beginning of each second time interval, the supply or withdrawl of heat energy to or from the group of rooms by the heating or air conditioning system is switched off entirely, to the extent that this is possible or permissible. If this group of rooms is assigned its own boiler, which heats this group of rooms alone, then this boiler of the heating system is shut off entirely at the beginning of the second time interval and thus a reduction in the initial flow temperature of the boiler is also permitted.

In the case of the generally provided circulation of the heating or cooling medium through the heat exchanger in the group of rooms by means of one or more pumps, it is always suitable to shut off this pump or pumps as well at the beginning of each second time interval, if for no other reason than to save the electrical current needed to drive them.

In the case of air conditioning systems or hot-air heating, where it is necessary or desirable that supply air, consisting entirely or in part of fresh air, be blown continuously into the rooms of the group or into at least one of the rooms over the entire duration of every second time interval, for the sake of providing a continuous exchange of air. This means that if the supply air blown into this room or rooms is cooled or heated, it also supplies heat or cold to the room or rooms even after the beginning of each second time interval. For example, in air conditioning systems in which supply air of constant temperature is prepared in a central location and is blown out into the rooms as primary air by means of induction-coil apparatuses, it may be suitable, in order to obtain sufficient air exchange, to blow this primary air into the rooms without change even during the second time intervals, and only to block off the output of the heat exchanger of the induction-coil apparatuses on the air side or the water side, depending on their design, at the beginning of each second time interval.

Because from the beginning of each second time interval, the actual value of the room temperature is exclusively computed and not measured, the arrangement according to the invention is suitable, in particular, for application in which the durations of the second time intervals are relatively short, preferably approximately 0.5 to 20 hours. The second time intervals may preferably extend from 3 to 12 hours, such as is called for in heating systems with provision for reducing the room temperature at night, where the room temperature is thus lowered every night, such as between 10 p.m. and 6 a.m. or within other programmed time limits.

The invention can also be used with second time intervals which are relatively long. For instance, when the computation of the actual value for the room temperature is still sufficiently precise over periods of longer than 20 hours, a support for the room temperature during the second time interval can be provided. In contrast, with short second time intervals, this feature can often be omitted.

The second time intervals may be programmed by means of conventional time switch clocks or time switching devices on a daily and/or on a calendar basis. However, it is also possible to provide, in place of such programming or in addition thereto, an individual programming capability in which, at an arbitrary moment, the beginning and the end of a single second time interval (that is, one which is not periodically repeated) is programmed in by hand. This makes it possible, for instance, in the case of a single-family house or an apartment, that the housewife, upon leaving the home to go shopping and estimating the time of her absence at, say, two hours, then initiates the beginning of a second time interval when she leaves and enters the end of the time interval in the program switch clock. Then when she returns from shopping, the room temperature in the home will have returned to its normal value. This is, naturally, only one example. There are numerous other applications or situations in which the one-time programming of brief second intervals can bring about significant savings in energy.

Given brief second time intervals, it may be suitable in many cases for the outside temperature prevailing at the beginning of the second time interval to be made the sole basis for the computation of the curve of the actual room temperature value. However, it is better and more precise to take the weather or outside temperature into consideration continuously during computing should the weather or outside temperature change during the computation of the actual value curve. Also, the computation of the rapid heating or rapid cooling curve when the second time intervals are short may often be suitably based on the outside temperature prevailing at the beginning of the second time interval. Usually, however, it is more efficient to take varying weather conditions, in particular varying outside temperatures, into continuous consideration when computing both curves.

The determination of the instant of beginning of the rapid heating or rapid cooling may be done in various ways.

The invention will be better understood and further objects and advantates thereof will become apparent from the ensuing detailed description of a preferred embodiment taken in conjunction with the drawings.

BRIEF DESCRIPTION OF THE DRAWINGS

FIG. 2 is a diagram of room temperature plotted over time for the purpose of explaining the functioning of the arrangement of FIG. 1.

DESCRIPTION OF THE PREFERRED EMBODIMENT

Figure 1:
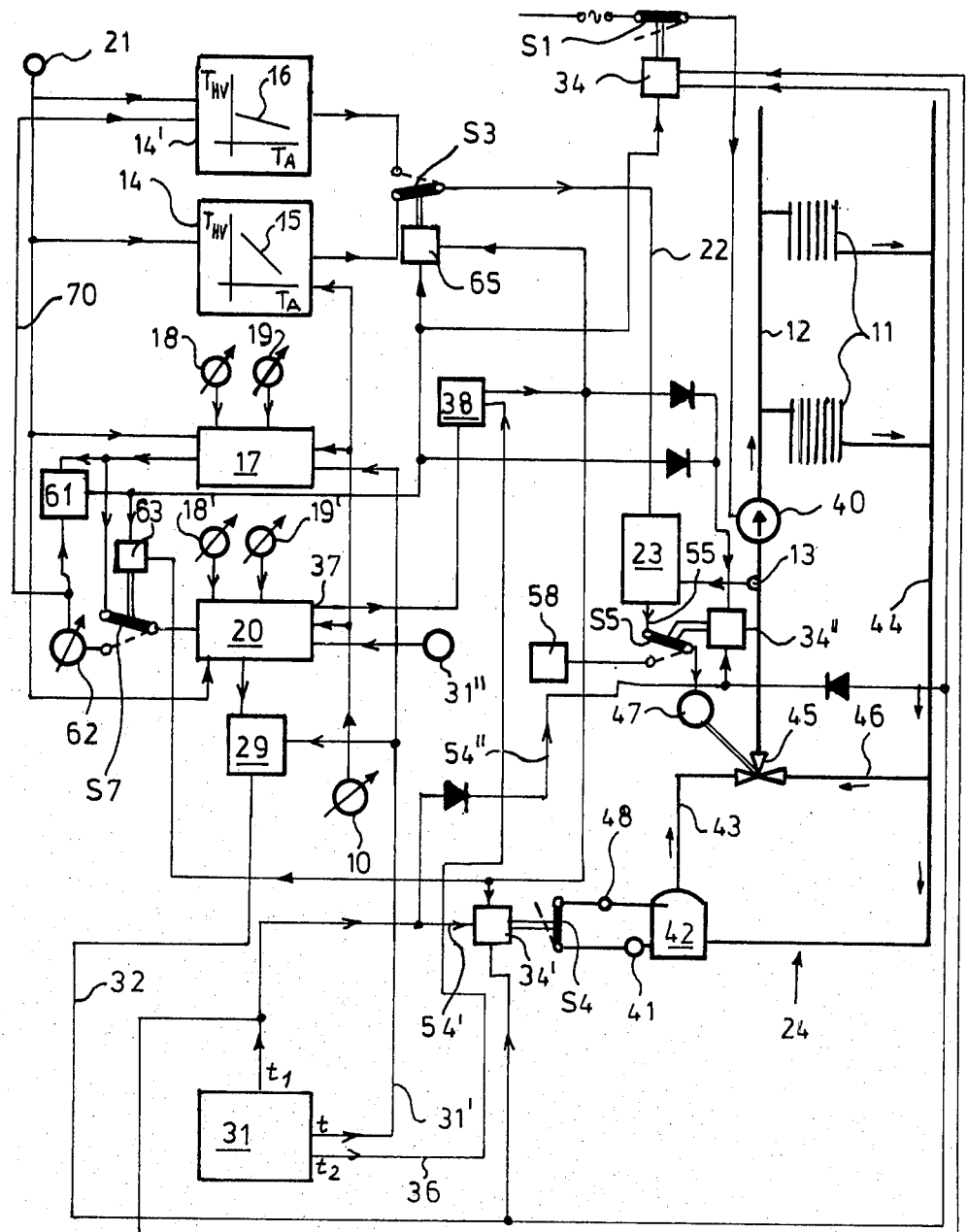
FIG. 1 is a block diagram of an arrangement for controlling room temperature constructed in accordance with the invention.

Referring now to the drawings, it is assumed that a constant normal value $T_n$ for room temperature $T_R$, which can be initially set by means of an initial setting element 10 (see FIG. 1), is controlled during the first time intervals $J_1$ (see FIG. 2). However, it is also possible to adjust the normal value $T_n$ for the room temperature $T_R$ in a sliding fashion in a known manner in accordance with the weather and in particular with the outside temperature $T_A$. This is preferably done in such a fashion that with an increasing outside temperature, the normal value $T_n$ also increases.

The diagram of FIG. 2 applies to the case where the rooms of one group in a building, such as those belonging to an apartment, are heated in common. In accordance with FIG. 1 all the heat exchangers located in the particular rooms, having water flowing through them and comprising convectors, such as heat exchangers 11, are all supplied with forward-flow water of the temperature $T_{HV}$ via a single common forward-flow heating line 12. The forward-flow heating water temperature $T_{HV}$, sensed by a probe 13, is regulated during the first time intervals $J_1$ in accordance with the outside temperature $T_A$ in accordance with a sliding desired value predetermined by a so-called heating curve. The desired value determines the functional connection between the outside temperature $T_A$ and the forward-flow heating water temperature $T_{HV}$ required for the controlling of the initially set normal value $T_n$.

When it is intended to raise or to lower this normal value $T_n$, the heating curve is altered. Entered into each of the heating curve elements 14, 14' which compute the desired value at a particular time of the forward-flow heating water temperature $T_{HV}$, which is supplied via the line 22 to a controller 23 for controlling the forward-flow heating temperature on the basis of the heating curves initially set in these elements 14, 14', is a heating curve diagram with the abscissa $T_A$ and the ordinate $T_{HV}$ and two exemplary heating curves 15, 16. Heating curve 15 determines the desired value of $T_{HV}$ for controlling the normal value $T_n$ of the room temperature and the heating curve 16 determines the desired value of $T_{HV}$ for controlling the minimum room temperature $T_f$ (see FIG. 2).

In the diagram of FIG. 2, the abscissa represents the time t and the ordinate represents the room temperature $T_R$. A first time interval $J_1$ ends at time $t_1$ and this time $t_1$ thus also corresponds to the beginning of the illustrated second time interval $J_2$, which ends again at time $t_2$ and during which the room temperature $T_R$ in the rooms of a building (not shown in further detail) heated in common by the heating system 24 of FIG. 1 is reduced for the purpose of saving energy.

From time $t_1$, a second computer 17 receives input data, in accordance with the outside temperature $T_A$ fed into it by an outside temperature probe 21 and also in accordance with at least one building value which is either fixed or fed into it by means of an initial setting element 18 and takes into consideration the heat insulation of the rooms and their heat-retaining mass and further in accordance with at least one value which is either fixed or fed into it by means of an initial setting element 19 and takes into consideration the properties of the heating system (in particular its heat capacity). The second computer 17 thus computes the reduction of the actual value $T_{RJ}$ for the room temperature from the beginning of the second time interval. The data fed in fixed form into this second computer 17 are initially set by means of the manually settable initial setting elements 18, 19 in such a manner that the computer 17 computes the course over time of the actual value $T_{RJ}$ for room temperature $T_R$, in accordance with the outside temperature, in a manner faithful to actuality for an expected normal case, from the time $t_1$ until the switching on of the rapid heating (the normal case may be, for instance, that the doors and the windows of the rooms are closed and no heat sources which substantially affect the temperature are turned on).

From the beginning at time $t_1$ of the second time interval $J_2$, a first computer 20 performs a computation, repeated at periodic intervals, of the time $t_x$. From this time, at the instantaneous computed actual value $T_{RJ}$ for the room temperature which has been fed into the first computer 20 by the second computer 17, the rapid heating must be begun within this second time interval $J_2$, so that by applying the maximal heat output of the heating system 24, which in the embodiment of FIG. 1 is a warm-water central heating system, the normal value $T_n$ for the room temperature has again been attained by the end $t_2$ of the second time interval. This computation of the switch-on time $t_x$ for the rapid heating takes place in accordance with the following data fed into the first computer 20:

the outside temperature $T_A$ fed into the first computer by means of the probe 21;

the synchronizing time furnished by the clock 31''; and building values and values for the heating system fed in by means of initial setting elements 18' and 19' which may in some cases be partially or entirely identical to the initial setting elements 18, 19.

The above data affect the computation of the rapid heating curve (in FIG. 2, three rapid heating curves are plotted and marked in double-dot-dash lines pertaining to various outside temperatures and are given reference numerals 26, 26' and 26''). The initial setting elements 18', 19' may also be initially set by hand and the values fed in by means of these initial setting elements 18', 19', when they are the correct values, are no longer modified, even if the associated properties of the building or of the heating system change. The same is true of the initial setting elements 18, 19.

The computation of the time $t_x$ by the first computer 20 may be periodically repeated, for instance at intervals of one minute, with the computation each time being on the basis of the outside temperature sensed at the time by the probe 21 and of the instantaneous actual value $T_{RJ}$ computed by the second computer 17 and fed into the first computer 20. Thus a somewhat different time $t_x$ may result each time the computation is repeated.

The rapid heating curve corresponding to the result of the computation of $t_x$ as a function of $T_{RJ}$, represented by the symbol $t_x(T_{RJ})$, is thus computed backwards from time $t_2$ on the basis of the normal value $T_n$ because of the slow reduction of the computed actual value of the room temperature; i.e., in the rapid heating curves 26, 26' and 26" indicated as examples, computation occurs in each case from the top right to the bottom left, with each computed value $t_x$ from the first computer 20 being fed into a first comparator 29 and stored there until the next computation.

At time $t_e$, the first comparator 29 delivers a switching pulse into its output line 32 for switching on the rapid heating whenever the instantaneous time t fed into it from the switching device 31 via the line 31' corresponds to the time value $t_x$ stored in the first comparator 29. The manner in which the rapid heating is effected will be explained further below. Here it will be noted only that the rapid heating stops by the end $t_2$ of the second time interval $J_2$, and then a switch is made back to the control of the normal value $T_n$ of the room temperature in accordance with the outside temperature, so that from the time $t_2$ on, a first time interval $J_1$ again begins, which lasts until the next time $t_1$.

In the diagram of FIG. 2, three different actual value curves which are computed by the second computer 17, if necessary, in combination with a transducer 62 predetermining the minimum temperature $T_f$ are shown, designated $T_{RJ1}$, $T_{RJ2}$, and $T_{RJ3}$ for the room temperature $T_R$ from the beginning ($t_1$) of the second time interval $J_2$ to the particular switch-on time $t_e$ of the rapid heating. These curves are plotted in the diagram as dot-dash lines, to represent examples of such curves. The outside temperatures $T_A$ associated with these computed curves may be, for example, $+10°$ C., $0°$ C. and $-10°$ C.

The heating system 24 of FIG. 1 is furthermore so designed that its maximal heating output is just sufficient at, for example, $-20°$ C. to maintain the normal value $T_n$ of the room temperature in the first time intervals $J_1$. This means, however, that at an outside temperature of $-20°$ C. no notable reduction of the room temperature can be permitted to occur during the second time interval, because otherwise rapid heating up to the normal value of the room temperature would no longer take place, or would take place too slowly.

This may be effected automatically in the arrangement in accordance with FIG. 1 in that, with an outside temperature of $-20°$ C., the first computer 20, immediately upon being switched on (i.e., at the beginning $t_2$ of the particular second time interval $J_2$), delivers a pulse from its separate output 37 into a resetting element 38, which thereupon cancels this second time interval $J_2$ and thus switches immediately to the controlling of the normal value $T_n$ of the room temperature. This second time interval $J_2$ is thus treated as if it were a first time interval (see the curve 35 plotted in broken lines in FIG. 2).

The resetting element 38 is also subjected by the switching clock 31 to a pulse at every time $t_2$, via the line 36, as a result of which it switches over to the next successive first time interval, if this has not already occurred at the beginning of the second time interval $J_2$ in the manner which has just been described.

When the outside temperature $T_A$ is in a range in which the maximal heating output of the heating system is not required for maintaining the normal value for the room temperature, then at the beginning $t_1$ of each second time interval $J_2$, a complete shutdown of the heating system 24 always occurs; i.e., both the boiler burner 41 and the pump 40 of the heating system 24 are shut off. Thus any supply of heat energy to the rooms heated by this heating system is shut off and the heating system slowly cools down. This, too, will be discussed in greater detail further below.

Depending on the length of the second time interval $J_2$, there is the danger at low outside temperatures $T_A$ of an undesirably extensive cooling of the building rooms during the second time interval $J_2$. This may be avoided by providing a support of the room temperature to a preferably constant, controlled minimum room temperature indicated as $T_f$ in the diagram of FIG. 2. This minimum temperature $T_f$ may be, for instance, $8°$ to $16°$ C. Whenever the computed actual value $T_{RJ}$ of the room temperature, during a second time interval $J_2$, reaches this predetermined minimum temperature value $T_f$, which has been manually set initially at the transducer 62, and whenever, at this time, the rapid heating has not yet been switched on, then a switchover is made from the heating curve element 14 onto the heating curve element 14'.

Then from this time ($t_g$ in FIG. 2) on, the forward-flow heating water temperature $T_{HV}$ of the heating system 24 is regulated in accordance with the desired value, which is in turn determined by the heating curve 16 (FIG. 1) in accordance with the outside temperature $T_A$. The heating curve 16 is thereby selected to be such that, by this means, the room temperature is controlled to the value $T_f$. If the value $T_f$ is differently set initially at the transducer 62, then the heating curve 16 in the heating element 14' is accordingly adjusted via the line 70.

The warm-water central heating system 24 has a boiler 42, a boiler forward-flow line 43, the heating forward-flow line 12, the heat exchangers 11, a return-flow heating line 44 and a three-way mixer 45. A branch line 46 of the heating return-flow line 44 leads to one input of the mixer 45, whose other input is connected to the boiler forward-flow line 43. The return-flow heating line 44 also leads to the boiler 42. The forward-flow heating line 12 is connected to the sole output of the mixer 45. The mixer 45 is adjustable by means of a servomotor 47, and in its one limit position, which may be designated "fully open", it carries solely the forward-flow boiler water coming from the line 43 into the forward-flow heating line 12.

The pump 40 which circulates the water is disposed in the forward-flow heating line 12 so that when the mixer is at "fully open", all the heat exchangers 11 are supplied with forward-slow heating water of maximum temperature. This temperature corresponds to the forward-flow boiler temperature of the boiler 42 which is regulated by a thermostat 48 to a maximum value, for instance, $90°$ C. So long as an on-off switch S4 located in the electrical circuit of the boiler thermostat is closed, the thermostat 48 regulates the maximum forward-flow boiler temperature by switching the burner 41 on and off. Whenever the switch S4 is opened, the thermostat 48 is shut off, and the burner 41 remains shut off, so that there can be no heating of the boiler water.

The switches shown in FIG. 1, when they are in the positions indicated by heavy lines, are in switching states which are present during first time intervals $J_1$ and thus serve the purpose of controlling the normal value $T_n$ of the room temperature $T_R$ which is initially set by means of the initial setting element 10. The setting element 10 is connected not only to the two computers 17 and 20 but also to the heating curve element 14. To this end, the heating curve element 14 is connected by means of the switch S3 to the line 22 leading to the controller 23 so that the desired value of $T_{HV}$, determined by the initially set heating element 15 in accordance with the outside temperature $T_A$, is fed into the controller 23 via the line 22.

The actual value of the forward-flow heating water temperature $T_{HV}$, which is sensed by means of the probe 13, is also fed into the controller 23. A switch S5 connects the output of the controller 23 with the servomotor 47 which adjusts the mixing valve 45 in accordance with the control deviation sensed by the controller 23 in such a manner that the forward-flow heating water temperature $T_{HV}$ is regulated in the line 12 in accordance with the heating curve 15. The forward-flow boiler temperature is thereby held, as a result of the closed switch S4, to a constant maximum value initially set at the thermostat 48, and the mixer 45 mixes cooler heating return-flow water in with the boiler forward-flow water for the purpose of affecting the forward-flow heating water temperature $T_{HV}$.

At each programmed time $t_1$, the switching device 31 delivers a switching pulse on the lines 54, 54', 54" to final control elements 34, 34', 34", by means of which the switches S1, S4, S5 are switched over into their positions indicated by broken lines. As a result, the heating system 24 is turned completely off because as a result of the open switches S1 and S4, the pump 40 and the burner 41 are shut off. Also, the controller output 55 is shut off by the switch S5. The servomotor 47 is connected by means of switch S5, in its position indicated by broken lines, to a transducer 58, which controls the servomotor in such a manner that the servomotor 47 fully opens the mixer 45.

Because the heating system is thus shut off from time $t_1$, the heating system and the rooms heated thereby cool down more or less rapidly depending on the outside temperature. If it is assumed that the outside temperature is $-10°$ C., then the second computer 17 computes the drop in the room temperature in accordance with the actual value curve $T_{RJ1}$ plotted as one example in FIG. 2. If, instead, the outside temperature is $+10°$ C., for example, then the second computer 17 computes the drop in room temperature in accordance with the actual value curve $T_{RJ3}$. When different outside temperatures prevail, the computer 17 computes in accordance with other actual value curves, which each correspond to the actual drop in room temperature in the particular rooms of the building being controlled.

If the outside temperature changes while the computer 17 is operating, the computer takes this into consideration accordingly, because the outside temperature probe 21 continuously feeds the instantaneous outside temperature $T_A$ into the computer 17. This computer 17 delivers the computed actual value $T_{RJ}$ continuously into the first computer 20, so long as the switch S7 is in the switching position indicated by heavy lines. The first computer 20 and the first comparator 29 function as has already been described above, and when the first comparator 29 senses that the instantaneous time t has attained the time $t_x$ computed by the first computer 20, then the switch-on time t of the rapid heating has been attained; that is, the rapid heating of the rooms in the building is switched on by means of the switching signal delivered on the output line 32 by the first comparator 29.

To this end, the final control elements 34, 34' connected to the output of the comparator 29 are actuated in such a manner by this switching signal, that the switches S1 and S4 are switched on again. Thus, the pump 40 functions again and the burner 41 heats the forward-flow boiler water again to the maximum forward-flow boiler temperature regulated by the thermostat 48, of 90° C., for example. The switch S5 remains in its position indicated by broken lines, so that the mixer 45 remains fully opened and thus solely forward-flow boiler water flows into the heating forward-flow line 12 from the line 43.

As a result, the rooms heated by means of the heat exchangers 11 are supplied with the maximum heating output which can be brought to bear on the part of the heating system 24 so that a rapid heating of these rooms occurs. This rapid heating lasts until the programmed end $t_2$ of the second time interval. At this time $t_2$, the program time switching device 31 delivers a switching pulse into the line 36 to which the resetting element 38 is connected, which switches all the switches S shown in FIG. 1 back into the switching positions indicated by heavy lines. Thus, once again, the normal value $T_n$ of the room temperature is controlled until the beginning of the next successive second time interval $J_2$.

In the diagram of FIG. 2, at very low outside temperatures and at higher outside temperatures (as may be seen by the exemplary curves $T_{RJ1}$, $T_{RJ3}$) the minimum value $T_f$ of the room temperature is not attained. Instead, a switchover has already been made to rapid heating at the ascertained time $t_e$. In an intermediate outside temperature range, however, the case may present itself that the room temperature drops during the second time interval down to the value $T_f$ and the computed actual value curve $T_{RJ}$ then accordingly attains the value $T_f$. This is illustrated by one example for the actual value curve $T_{RJ2}$ in FIG. 2. Because the temperature must not fall below this minimum temperature $T_f$, it is determined by means of a second comparator 61 (FIG. 1) when the second computer 17 computes the value $T_f$.

The value $T_f$ is also fed into this second comparator 61 and the value $T_f$ is initially set at the initial setting element 62. When the second comparator 61 determines that the actual value $T_{RJ}$ computed by the second computer 17 corresponds to the value $T_f$, then, by means of the final control elements 63, 65, 34", comparator 61 switches the switches S7 and S3 into the positions indicated by broken lines, and switches the switch 55 over into the position indicated by heavy lines. Now, the initial setting element 62 is connected to the particular input of the first computer 20 instead of to the input of the second computer 17, so that this computer 20 now periodically computes the switch-on time $t_x$ for the room temperature $T_f$ for the purpose of determining the switch-on time $t_e$ for the rapid heating.

From the time when the second comparator 61 responds, which occurs in the curve $T_{RJ2}$ of FIG. 2 at time $t_g$, the room temperature is controlled by the electric circuit layout of FIG. 1 in accordance with the minimum room temperature value $T_f$ initially set at the transducer 62. This occurs because the switch S3 is switched into its position indicated by broken lines, so that the heating curve element 14″ furnishes the desired value to the controller 23 in accordance with the heating curve 16. Because the switch S5 is in the position indicated by heavy lines, the controller 23 regulates the forward-flow heating water temperature $T_{HV}$ in accordance with the desired value furnished by the heating curve element 14″, and, as a result, the room temperature is supported up to the value $T_f$. From the time $t_g$, the supply current circuit of the pump 40 is also switched on by means of the switch S1 because the second comparator 61 accordingly energizes its final control element 34.

When the first comparator 29 senses that the instantaneous time t has attained the time $t_x$ periodically fed into the first comparator 29 by the first computer 20, then the first comparator 29 switches on the rapid heating in the manner already described above. However, the first comparator 29 additionally switches the switch S5 back into the position indicated by broken lines by means of corresponding triggering of the final control 34′, which may be, for example, a bistable relay, so that the transducer 58 triggers the servomotor 47 to fully open the mixer 45 again. As a result, the maximum heating output is brought to bear by the heating system 24 for the purpose of rapid heating of the rooms. At the time $t_2$, as described above, a switchover is made to the next successive first time interval.

The components of the circuit layout of FIG. 1 serving the purpose of controlling the room temperature during the first and second time intervals $J_1$ and $J_2$ may particularly advantageously be in the form of electrical and electronic components so that the circuit layout is then an electrical circuit layout. However, it is also conceivable that the individual components be given a non-electric structure. For instance, the servomotor 40, instead of being formed as an electromotor, may be embodied as an electrically heated expansible element, a hydraulic cylinder, or the like.

Instead of always controlling the extreme value for the room temperature in the second time interval in the illustrated embodiment of the invention described above, whenever the computed actual value of the room temperature reaches this extreme value, it may also be advantageously provided, with still further savings in energy, that the control of this extreme value be initiated only whenever, first, the computed actual value has attained the extreme value or fallen below it, and, second, a further condition has also been satisfied, namely that the instantaneous outside temperature is below the extreme value by at least a predetermined amount, such as by 6° C. or more. This predetermined amount may be dependent on the level of the extreme value and should be selected such that not only is the rapid heating reliable but also no danger of freezing arises at all in the shut-off heating system or in the rooms which are to be heated by the heating system. If, in the case of heating, the extreme value is set to be, for example, from 8° to 16° C., its control can be initiated only when the instantaneous outside temperature is below, for example, +2° C., or the average value of the outside temperature over the course of a predetermined number of hours (for example, 12 or 24 hours) has been below +2° C. or below some other low average value, which may preferably be located in the vicinity of 0° C. The average value of the outside temperature may be computed together with other values by a computer, for example. This may, for example, be additionally computed by the first computer 20 or the second computer 17.

The above described embodiment relates to the controlling of the room temperature by means of a heating system. However, the invention is also applicable in the case of controlling the room temperature of the particular rooms to be controlled by means of an air conditioning system serving to cool such rooms. This system may, if desired, also serve to heat the rooms during the cold season. The arrangement then automatically makes the decision whether rapid heating or rapid cooling is to be initiated at a particular time, in order again to reach the normal value for the room temperature toward the end of the particular second time interval. This is true because the first computer 20 always furnishes the actual value for the room temperature regardless of whether this value is above or below the normal value for room temperature or whether it corresponds to the normal value. Accordingly, the first computer 20 then always provides the switch-on time for the rapid heating or cooling depending upon whether the computed instantaneous actual value for the room temperature is above or below the normal temperature. Rapid heating is initiated whenever the computer actual value at the appropriate time is below the normal value of the room temperature and rapid cooling is initiated whenever the computed actual value for room temperature at that time is above the normal value for room temperature.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. An arrangement in the form of an electrical circuit or the like for controlling in common the room temperature of a group of rooms intended for human occupancy in a building or the like in accordance with the weather including the outside temperature by controlling the output of a heat transfer system, such as a heating system or a cooling system, for said group of rooms, including:

timing means for defining a series of predetermined first and second time intervals, each of said second time intervals beginning at the end of a first time interval and ending at the beginning of the next successive first time interval;

first system control means for controlling the output of said heat transfer system, i.e. the transfer of heat energy with respect to said group of rooms, during said first time intervals to maintain a normal room temperature value;

system shut-off means for reducing the output of said heat transfer system to a minimum value at the beginning of said second time interval;

maximum output means for increasing the output of said heat transfer means to a maximum value before the termination of said second time interval to effect a rapid transfer of heat energy with respect to said group of rooms, whereby as a result of the rapid heat transfer, the normal value for the room temperature is at least substantially attained toward the end of said second time interval;

first computer means for computing the change to be expected in the room temperature as a result of said rapid heat transfer as a rapid heat transfer curve, taking into consideration building values, values of said heat transfer system and the instantaneous weather,; and second computer means for computing an actual value curve ($T_{RJ}$) of the room temperature (TR) from the beginning of each second time interval until the beginning of said rapid heat transfer, taking into consideration the building values, the values of said heat transfer system and the instantaneous weather;

wherein said maximum output means includes first comparator means for initiating said rapid heat transfer whenever the actual value curve at that time attains the computed rapid heat transfer curve.

2. An arrangement in accordance with claim 1, including:

second system control means for controlling the output of said heat transfer system to maintain a predetermined extreme value of the room temperature in accordance with the instantaneous weather;

first switching means for activating said second system control means whenever the computed actual value of the room temperature attains this extreme value; and second comparator means for initiating said rapid heat transfer whenever said rapid heat transfer curve attains said extreme value.

3. An arrangement in accordance with claim 2, which further comprises:

temperature determining means for determining an outdoor temperature value; and second switching means for activating said second system control means only when, first, said extreme value is intermediate said outdoor temperature value and the normal room temperature value, and, secondly, the difference between the outdoor temperature value and the extreme value exceeds a predetermined amount.

4. An arrangement in accordance with claim 3, wherein outdoor temperature value is an said average value for the outside temperature formed over a predetermined period of time, up to 24, preceding the particular instantaneous time.

5. An arrangement in accordance with claim 3, wherein said outdoor temperature value is an instantaneous value for the outside temperature.

6. An arrangement in accordance with claim 3, wherein said heat transfer system is a heating system, said rapid heat transfer is a rapid heating, said rapid heat transfer curve is a rapid heating transfer curve, said extreme value for the room temperature is a minimum value, whereby said second system control means operates only when said outdoor temperature value is below said extreme value by a predetermined amount.

7. An arrangement in accordance with claim 3, wherein said heat transfer system is a cooling system, said rapid heat transfer is a rapid cooling, said rapid heat transfer curve is a rapid cooling curve, extreme value for the room temperature is a maximum value, whereby said second system control means operates only when said outdoor temperature value is above said extreme value by a predetermined amount.

8. An arrangement in accordance with claim 2, wherein said heat transfer system is a heating system, said predetermined extreme value for the room temperature is a minimum value, said rapid heat transfer is a rapid heating, and said rapid heat transfer curve is a rapid heating curve.

9. An arrangement in accordance with claim 2, wherein said heat transfer system is a cooling system, said predetermined extreme value for the room temperature is a maximum value, said rapid heat transfer is a rapid cooling, and said rapid heat transfer curve is a rapid cooling curve.

10. An arrangement in accordance with claim 1, wherein during said second time intervals, the switch-on time ($t_x$) of said rapid heat transfer required for the instantaneously computed actual value ($T_{RJ}$) of the room temperature is continuously computed by said first computer means and said rapid heat transfer is initiated by said first comparator means whenever the computed switch-on time ($t_x$) coincides with the instantaneous time (t).

11. An arrangement in accordance with claim 1, wherein said group of rooms comprise an apartment.

12. An arrangement in accordance with claim 1, wherein said group of rooms comprise an entire building.

13. An arrangement in accordance with claim 1, wherein said group of rooms comprise one zone in a building.

14. An arrangement in accordance with claim 1, wherein the length of said second time interval is a maximum of 20 hours.

15. An arrangement in accordance with claim 1, wherein said normal room temperature is a constant temperature.

16. An arrangement in accordance with claim 1, wherein said normal room temperature is determined in accordance with the weather.

17. An arrangement in accordance with claim 1, wherein said arrangement is an arrangement for the open-loop control of said heat transfer system.

18. An arrangement in accordance with claim 1, wherein said arrangement is an arrangement for the closed-loop control of said heat transfer system.

19. An arrangement in accordance with claim 1, wherein during said second time intervals, the switch-on time ($t_x$) of said rapid heat transfer required for the instantaneously computed actual value ($T_{RJ}$) of the room temperature is periodically computed by said first computer means, and said rapid heat transfer is initiated by said comparator means whenever the instantaneous time has exceeded this switch-on time ($t_x$) since the last comparison thereof by the comparator means.

20. An arrangement in accordance with claims 1, 3 or 19, wherein said heat transfer system is a heating system, said rapid heat transfer is a rapid heating, and said rapid heat transfer curve is a rapid heating curve.

21. An arrangement in accordance with claims 1, 3, or 19, wherein said heat transfer system is a cooling system, said rapid heat transfer is a rapid cooling, and said rapid heat transfer curve is a rapid cooling curve.

* * * * *